United States Patent [19]
Hintner et al.

[11] Patent Number: 5,855,491
[45] Date of Patent: Jan. 5, 1999

[54] DEVICE FOR THE DETACHABLE FASTENING OF ONE OR MORE INSTRUMENTS AT ONE OR MORE LOCATIONS AND FOR THEIR ELECTRICAL CONNECTION

[75] Inventors: Gottfried Hintner, Schopfheim; Udo Grittke, Lörrach, both of Germany

[73] Assignee: Endress+Hauser GmbH+Co., Maulburg, Germany

[21] Appl. No.: 805,418

[22] Filed: Feb. 25, 1997

[30] Foreign Application Priority Data

Mar. 29, 1996 [DE] Germany ............... 196 12 575.8

[51] Int. Cl.$^6$ ............... H01R 4/24
[52] U.S. Cl. ............... 439/409; 439/716; 439/425
[58] Field of Search ............... 439/209, 391, 439/409, 425, 435, 532, 716

[56] References Cited

U.S. PATENT DOCUMENTS 5,573,421  11/1996  Reichle ............... 439/409
5,662,493   9/1997  Reichle ............... 439/409

FOREIGN PATENT DOCUMENTS

| 0 159 078 A1 | 10/1985 | European Pat. Off. |
| 0 453 267 A1 | 10/1991 | European Pat. Off. |
| 2 208 213 | 6/1974 | France |
| 28 10 071 | 9/1979 | Germany |
| 34 39 338 A1 | 5/1985 | Germany |
| 39 33 703 | 4/1991 | Germany |
| 39 33 703 A1 | 4/1991 | Germany |
| 94 05 377.4 | 7/1994 | Germany |
| 44 12 783 | 10/1995 | Germany |
| 94 13 971 | 2/1996 | Germany |
| 295 12 465 U | 3/1996 | Germany |
| WO 96/03788 | 2/1996 | WIPO |

*Primary Examiner*—Khiem Nguyen
*Attorney, Agent, or Firm*—Bose McKinney & Evans

[57] ABSTRACT

A device is provided for the detachable fastening of one or more instruments (1) at one or more locations and their electrical connection to a cable (5) having one or more wires, using at least one fastening element which is mounted at one of the locations, in which device each instrument (1) has a snap mounting (12) by means of which it can be locked onto the respective fastening element, in which the electrical connection of the respective instrument (1) is carried out while it is being locked on, in which a cable mounting (4) is arranged on the fastening element, which cable mounting has a profile (45) reproducing the line shape, into which the line (5) is inserted, and which has a guide element which, while the instrument (1) is being locked on, engages into an identically-shaped recess (13) on the instrument (1), and in which the connection of the respective instrument (1) to the wires of the line (5) while the respective snap mounting (12) is being locked onto the respective fastening element is carried out, according to a first solution variant, by penetration contacts (6) arranged on the respective instrument (1), or is carried out, according to a second solution variant, by penetration contacts (91) arranged in a cover (9) arranged between instrument (1) and cable mounting (4), said penetration contacts being electrically connected to plug contacts (92) which are arranged on the cover (9) and which, in turn, engage in plug connectors (15) arranged on the instrument (1) while the latter is being locked on.

12 Claims, 5 Drawing Sheets

DEVICE FOR THE DETACHABLE FASTENING OF ONE OR MORE INSTRUMENTS AT ONE OR MORE LOCATIONS AND FOR THEIR ELECTRICAL CONNECTION

The invention relates to a device for the detachable fastening of one or more instruments at one or more locations and their electrical connection.

In the case of applications which are usual in measurement and control technology, for example in the monitoring, control or automation of relatively complex processes, it is normal to use a plurality of measuring instruments, for example pressure, temperature, flow or filling level measuring instruments, at the same time. A measuring instrument generally comprises a measurement pickup and an evaluation or switching instrument which is arranged remotely therefrom. The instruments must be connected individually, that it to say they have to be supplied with power, and, if appropriate, signal lines must be led to the instruments and away from the instruments.

In DE-A 39 33 703, a device is described for the detachable fastening of one or more instruments at one or more locations and their electrical connection to a cable having one or more wires,
which device has a fastening element,
in which device each instrument has a snap mounting, by means of which it can be locked onto the respective fastening element, and
in which the electrical connection of the respective instrument is carried out while it is being locked on.

Provided as fastening element is a rail, in particular a top-hat rail. Rigid, naked lines, which are enclosed by a plastic profile, extend in the rail in the longitudinal direction. The plastic profile has recesses which are arranged at intervals from one another and which in each case expose the lines over the width of the recesses. Arranged on the instruments are electrical contact elements which, when the instruments are being locked onto the rail, produce the electrical connection of the instruments to the lines.

One disadvantage of such a device is that the instruments can be locked on only at the locations which are fixedly prescribed by the recesses. A free selection of the interval between two adjacent instruments, such as can be necessary for ventilation or cooling, is not possible. In addition, the width of the instruments which can be inserted is not arbitrary, but is prescribed by the intervals between the recesses.

A further disadvantage is that the lines are not protected against oxidation, corrosion and moisture wherever plug-in spaces remain free. This can lead to problems in making contact in the case of a later equipping of these plug-in spaces.

A further disadvantage is that no provision is made to arrange individual instruments remotely from the rail. However, this can be necessary, for example in the case of cramped spatial conditions at the location of use.

It is an object of the invention to specify a device according to the respective preamble of claims 1 and 2, which has a high measure of flexibility in relation to the spatial arrangement and the width of the instruments, which enables wiring the instruments with very little effort, and in which the wires of the cable are arranged in a manner protected against oxidation, corrosion and moisture.

To this end, the invention according to a first solution variant comprises a device for the detachable fastening of one or more instruments at one or more locations and for their electrical connection to a cable having one or more wires, using at least one fastening element which is mounted at one of the locations,
in which device each instrument has a snap mounting by means of which it can be locked onto the respective fastening element and
the electrical connection of the respective instrument is carried out while it is being locked on,
wherein
a cable mounting is arranged on the fastening element, which cable mounting has a profile reproducing the cable shape, into which the cable is inserted, and which has a guide element which, while the instrument is being locked on, engages into an identically-shaped recess in the instrument and
wherein the connection of the respective instrument to the wires of the cable while the respective snap mounting is being locked onto the respective fastening element is carried out by penetration contacts arranged on the respective instrument.

According to a second solution variant, the invention further comprises a device for the detachable fastening of one or more instruments at one or more locations and for their electrical connection to a cable having one or more wires, using at least one fastening element which is mounted at one of the locations,
in which device each instrument has a snap mounting by means of which it can be locked onto
the respective fastening element and the electrical connection of the respective instrument is carried out while it is being locked on,
wherein
a cable mounting is arranged on the fastening element which cable mounting has a profile reproducing the cable shape, into which the cable is inserted, and which has a guide element which, while the instrument is being locked on, engages into an identically-shaped recess in the instrument,
wherein a cover is provided for the cable mounting,
on the inside of which penetration contacts are arranged which, when the cover is being closed, produce an electrical connection to the wires of the cable, and
on the outside of which plug contacts are arranged, which are electrically conductively connected to the penetration contacts, and
wherein the connection of the respective instrument to the plug contacts while the respective snap mounting is being locked onto the respective fastening element is carried out by plug connectors arranged on the respective instrument.

According to a configuration of the invention according to one of the two solution variants, the fastening element is a commercially available rail, especially a top-hat rail, on which instruments can be locked by means of the snap mountings, the cable mountings likewise have snap mountings and can be locked on at any arbitrary location along the rail.

According to another configuration of the invention according to the first solution variant, the fastening element is a wall fastening, which has a baseplate which is fixed on, especially screwed onto, a wall, a rail element, especially a top-hat rail section, is integrally molded onto the front area facing away from the wall, of said baseplate, the cable mounting being integrally molded onto the top-hat rail section.

According to a development of the other configuration, the fastening element has a snap mounting on its side facing the wall and may be optionally fastened on a wall or locked onto a rail using the snap mounting.

According to an advantageous development of the other configuration, the baseplate has at the side at least one connection device by means of which it can be connected to at least one further baseplate.

According to a development of the configuration according to one of the two solution variants, a coupling module is provided which has a basic element which can be snapped onto the rail.

According to a development of the other configuration according to the first solution variant, a coupling module is provided which has a basic element which can be connected to the connection device of the baseplate.

According to one configuration of a coupling module according to one of the two last-mentioned developments, the basic element has a first and a second section, each of which has a profile that reproduces the cable shape. A cover is provided which covers the two sections. One end of the cable can be inserted into the profile of the first section and one of a further line can be inserted into the profile of the second section. Penetration contacts are arranged in the cover, in a first region which is opposite the first section when the cover is closed, and in a second region which is opposite the second section when the cover is closed, and there is an electrical connection between the penetration contacts in the first region and the corresponding penetration contacts in the second region.

According to a development of the coupling module, at least two wires of the cable are data lines and there is arranged in the coupling module a resistor via which two of the data lines are interconnected.

Such a device can be used in a particularly versatile manner, since individual instruments or groups of instruments can be positioned arbitrarily in space in relation to one another. The connection of the instruments to the line is carried out directly during the locking of the instruments onto the fastening elements provided. The connection of further individual instruments or groups of instruments is carried out via the coupling modules. It is necessary only for the necessary lines to be inserted into the coupling module and for the cover to be closed.

The invention and further advantages will now be explained in more detail using the figures in the drawing, in which three exemplary embodiments according to the first solution variant and one exemplary embodiment according to the second solution variant are represented; identical elements are provided with the same reference symbols in the figures.

FIG. 1b shows a view of the rear of the instrument represented in FIG. 1a;

FIG. 3b shows a top view of the fastening element represented in FIG. 3a;

FIG. 4a shows a partially sectioned view of a device according to the second solution variant; and FIG. 4b shows a top view of the device represented in FIG. 4a;

Figure 1A:
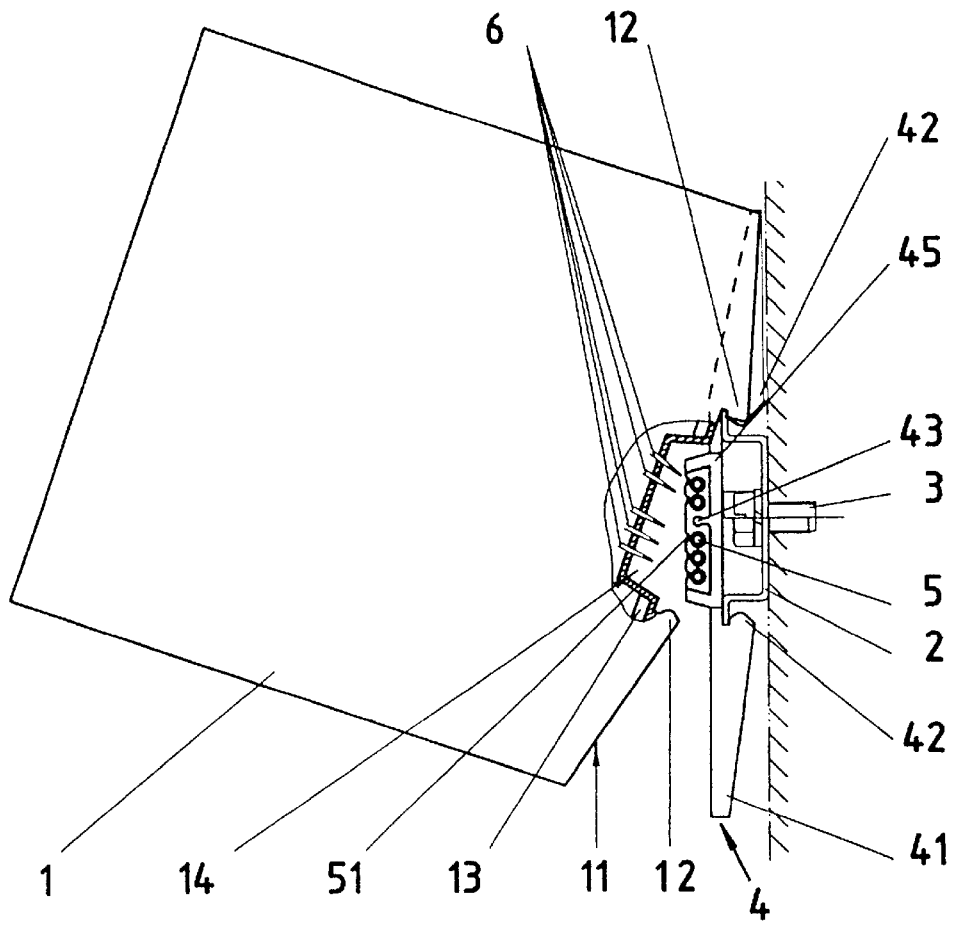
FIG. 1a shows a partially sectioned view of an exemplary embodiment of a device according to the first solution variant, in which the fastening element is a top-hat rail.

Represented in FIG. 1a is a partially sectioned view of an exemplary embodiment of a device according to the first solution variant, in which an instrument 1, for example an evaluation or switching instrument of a pressure, temperature, flow or filling level measuring instrument, is simultaneously to be fastened mechanically and connected electrically at a location.

A fastening element is represented, namely a top-hat rail 2, which is fastened by means of screws 3 on a wall represented by hatching in FIG. 1a. A cable mounting 4 is arranged on the top-hat rail 2.

Figure 2A:
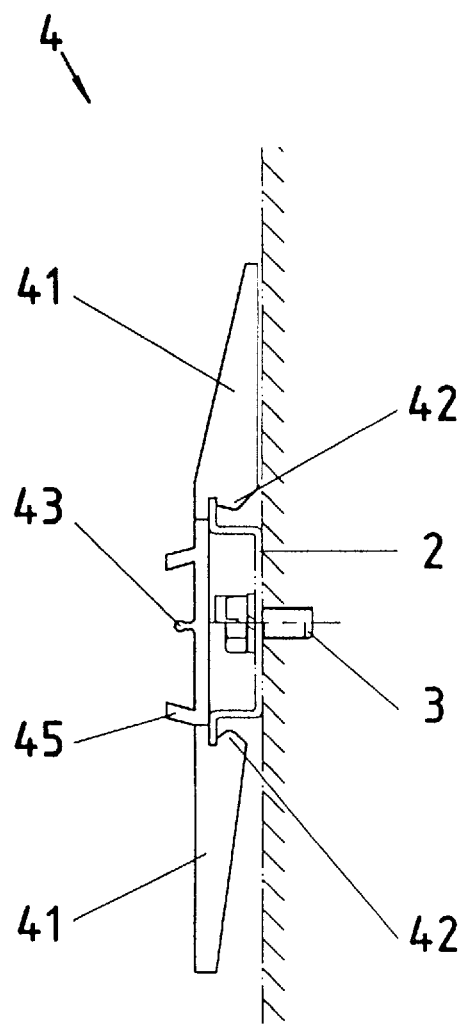
FIG. 2a shows a side view of the cable mounting represented in FIG. 1.
Figure 2B:
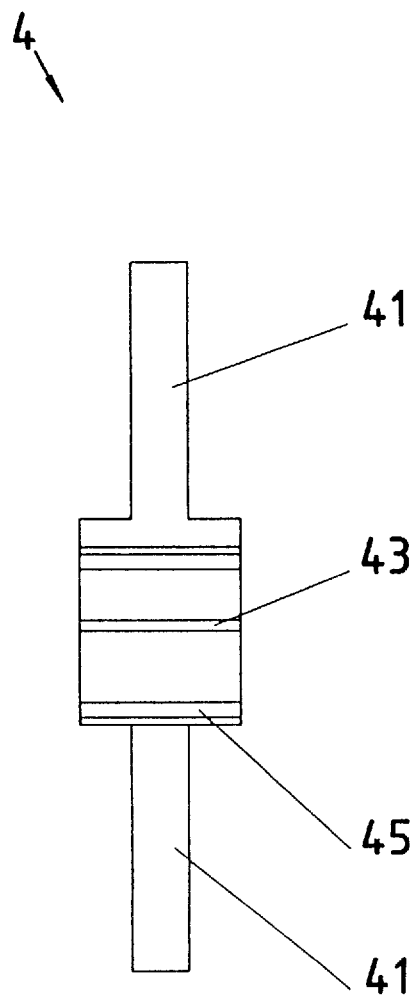
FIG. 2b shows a top view of the cable mounting represented in FIG. 1.

FIG. 2a shows a side view of the cable mounting 4 and FIG. 2b a top view of the cable mounting 4. It comprises a virtually rectangular base 41 and has, on its side facing the wall, a snap mounting 42 with which it is locked onto the top-hat rail 2. The overall length of the base 41 is available as a lever arm during locking on. The snap mounting 42 enables the cable mounting 4 to be fastened at any arbitrary location along the top-hat rail 2.

A profile 45, which serves to accommodate a cable 5, is integrally molded onto the base 41 on that side of the cable mounting 4 facing away from the wall. As can be seen from the top view, the profile 45 is broader than the base 41. The inner space of the profile 45 reproduces the shape of the cable 5. On the side facing away from the wall, the cross section of the profile 45 becomes thinner. As a result, the cable 5, after it has been pressed into the profile 45, is fixed in its position. For the purpose of additional fixing, a web 43, which engages into a groove-like recess 51 in the cable 5, is integrally molded in the center of the profile 45.

In the exemplary embodiment represented here, the cable 5 is a five-wire ribbon cable. Such a ribbon cable offers the advantage that it is flexible and can be shortened to an arbitrary length without special tools.

Of the five wires, two are physically separated from the remaining three wires by the groove-like recess 51. As a result, the orientation of the cable 5 is unambiguously fixed in the profile 45 and faulty assembly in this respect is precluded.

The division of the wires is preferably given by their use. For instance, the two separately arranged wires can be signal lines, and the three remaining wires can be one grounding and two power supply lines.

Figure 1B:
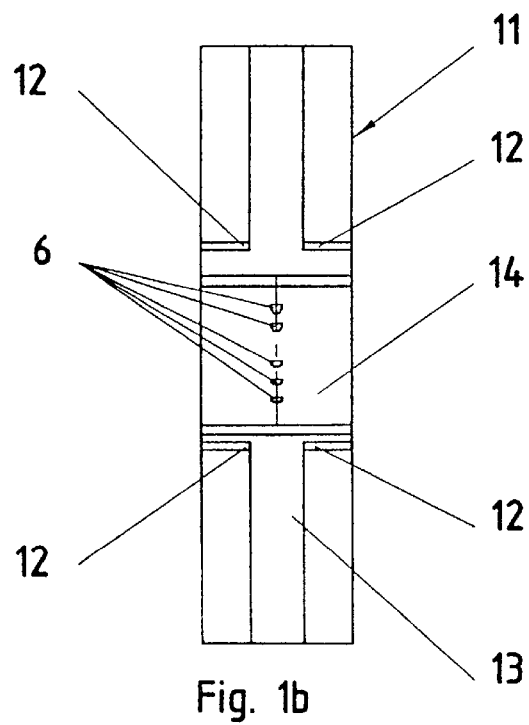

On its rear 11, the instrument 1 has a snap mounting 12, by means of which it can be locked onto the top-hat rail 2; see FIGS. 1a and 1b once more. The width of the rear 11 preferably corresponds to the width of the profile 45. In the center of the rear 11, a recess 13, whose width corresponds to the width of the base 41 of the cable mounting 4, runs in the longitudinal direction. The base 41 has the function of a guide element which engages into the identically-shaped recess 13 of the instrument 1 when it is being locked on. The snap mounting 12 consequently has two parts which are separated from each other by the recess 13.

In the center of the rear 11, transversely in relation to the recess 13, there runs a further recess 14 which, in the locked-on state, encloses the profile 45 and the cable 5 pressed into the latter.

In this recess 14, penetration contacts 6 are arranged such that, while the instrument 1 is being locked on, they pierce the insulation of the cable 5 and thus produce an electrical connection to the wires of the cable 5. The insulation of the cable 5 is preferably composed of a resilient plastic, for example of vulcanized rubber, thermoplastic rubber or polyurethane. Such materials are capable of flowing to a limited extent, so that the holes produced by the penetration contacts 6 in the insulation close themselves once more after the removal of the instrument. In consequence, the wires are always largely protected against oxidation, corrosion and moisture.

The device represented is, however, not limited to the use of top-hat rails. Any other type of rail, for example commercially available G-rails, which permit the instrument to be locked on, can equally be used. The geometry of the snap mountings 12, 42 should then be adapted appropriately.

Figure 3A:
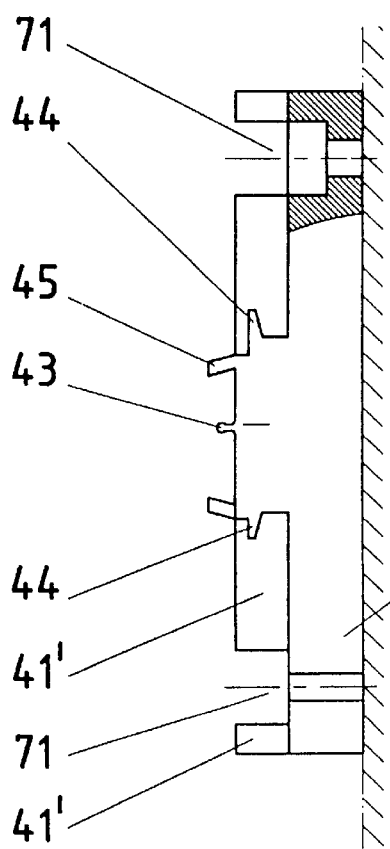
FIG. 3a shows a side view of a second exemplary embodiment of a fastening element according to the first solution variant, namely a baseplate to be fastened on a wall.
Figure 3B:
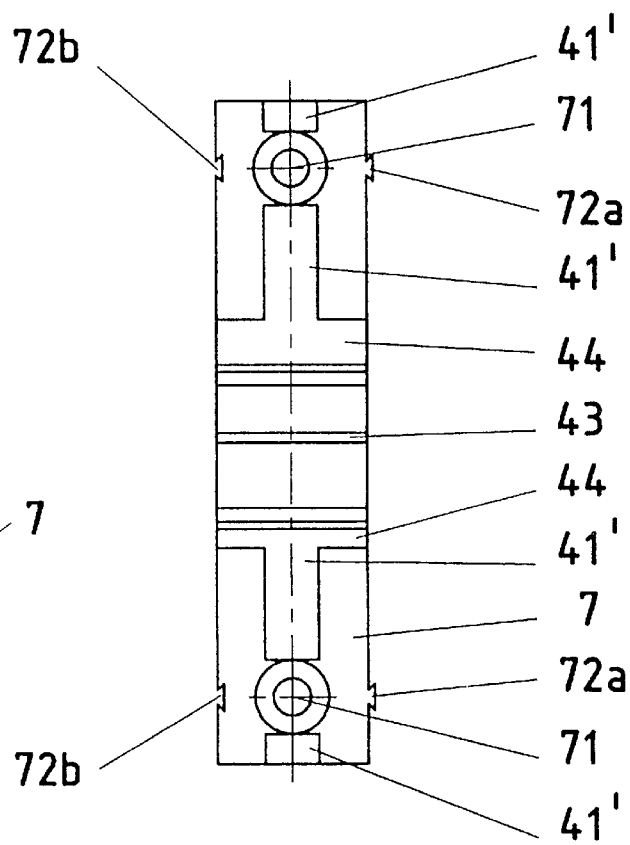

Represented in FIG. 3a is a side view, and in FIG. 3b a top view, of a further exemplary embodiment of a fastening element according to the first solution variant.

The fastening element comprises a rectangular baseplate 7 to be screwed on a wall, which has on that side facing away from the wall a construction which reproduces the top-hat rail 2 with the cable mounting 4 of FIG. 1.

A rectangular base 41' is integrally molded onto the baseplate 7, running in the longitudinal direction in its center. Furthermore, integrally molded in the center of the baseplate 7 is a profile 45 running transversely to the base 41', which corresponds to that represented in FIG. 1 and serves to accommodate the cable 5.

Integrally molded on both sides of the base 41' is a rail element 44 which in each case runs parallel to the profile 45 and at right angles to the base 41'. The outer dimensions of the rail element 44 are identical to the outer dimensions of the top-hat rail 2 of FIG. 1.

The baseplate 7 has a continuous hole 71 at each end, which in each case serves to accommodate a screw with which the baseplate 7 is to be screwed on a wall.

Fitted to the baseplate 7, at the side, is a connecting device by means of which the latter may be connected at both sides, for example to a further baseplate in each case. In the exemplary embodiment represented, this connecting device comprises two guide rails 72a which are arranged on one side of the baseplate 7, in each case at the level of the holes 71, and have a trapezoidal cross section, and two recesses 72b, which are arranged on the other side of the baseplate 7 at the same level and have an identical trapezoidal cross section.

Figure 3C:
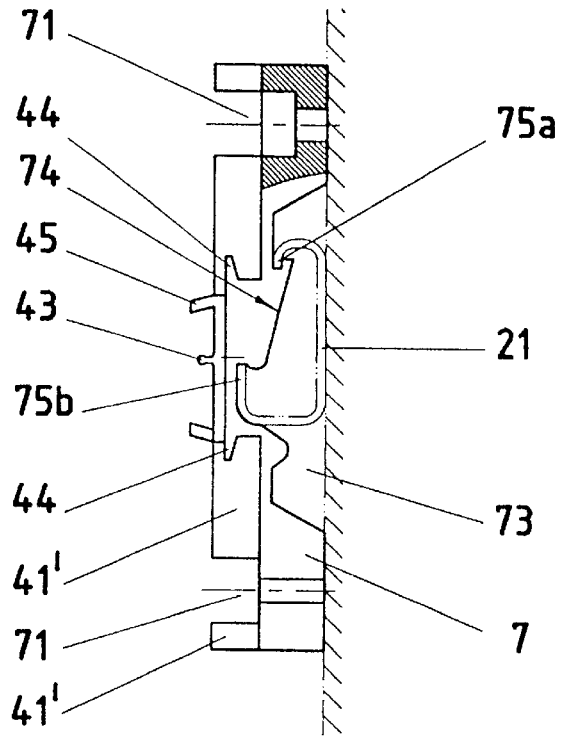
FIG. 3c shows a longitudinal section through a third exemplary embodiment of a fastening element according to the first solution variant, in which the fastening element can be optionally fastened on a wall or on a rail.

Represented in FIG. 3c is a longitudinal section through a third exemplary embodiment of a fastening element according to the first solution variant, which can optionally be fastened on a rail or on a wall.

In principle, it has the identical structure to the fastening element represented in FIG. 3a. Therefore, only the differences are described in more detail below.

Arranged on the side of the fastening element facing the wall is an additional recess 73. The latter has the form of a snap mounting which can be locked on a commercially available G-rail 21, which is drawn in FIG. 3c. A shoulder 74, which has two groove-like undercuts 75a, 75b, into which the side edges of the G-rail 21 lock, are integrally molded on the side of the fastening element facing the wall.

Equally well, the recess may have the shape of a snap mounting for a top-hat rail or another rail shape. It is thus possible to reduce the multiplicity of parts and any stock-holding which may be necessary.

Figures 4A, 4B:
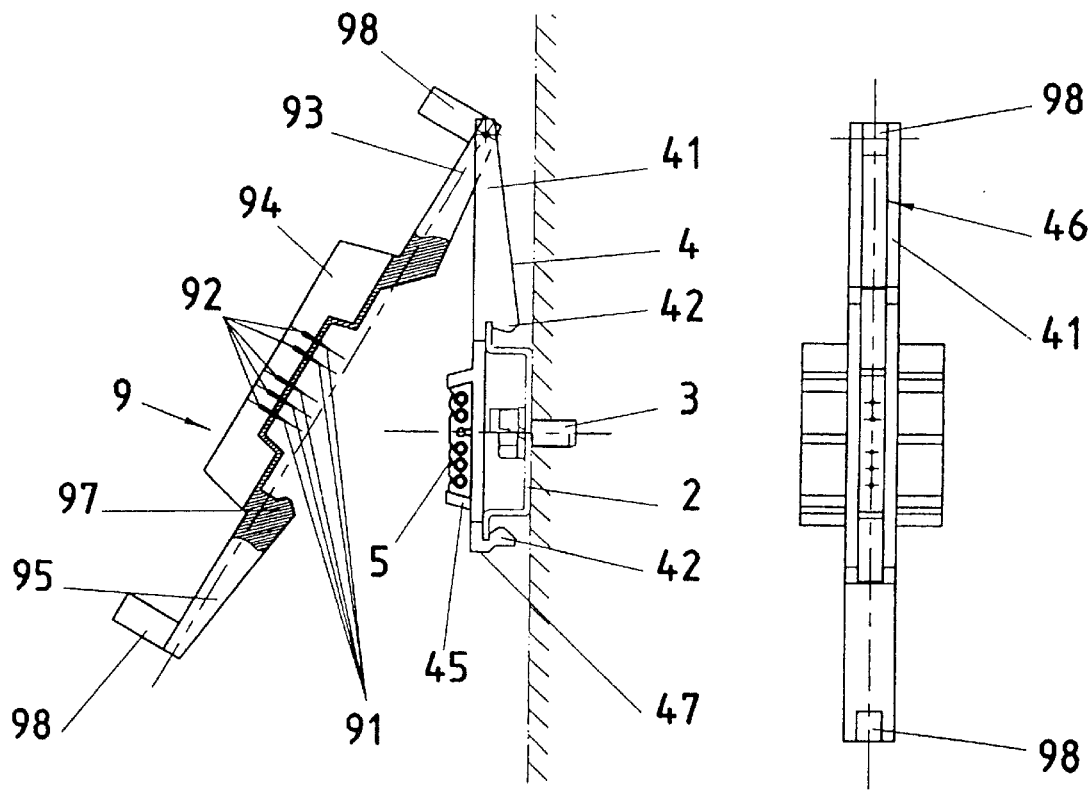

Represented in FIG. 4a is a side view, and in FIG. 4b a top view, of a device according to a second solution variant. Only the differences from the first solution variant represented in FIGS. 1a, 1b, 2a and 2b are listed here.

One substantial difference is that a cover 9 is arranged between the instrument and the cable mounting 4. Said cover 9 has on its inside penetration contacts 91 which, when the cover 9 is being closed, produce an electrical connection to the wires of the cable 5. Arranged on the outside of the cover 9 are plug contacts 92 which are permanently electrically conductively connected to the penetration contacts 91 and produce the electrical connection to corresponding plug connectors of the instrument when it is being locked on.

The cable mounting 4 is provided with a snap mounting 42, as in FIG. 2a, by means of which it is locked on the top-hat rail 2. In contrast to FIG. 2a, however, the base 41 extends on only one side of the profile 45. On both sides of the profile 45, the cable mounting 4 has a recess 46 which is in each case arranged in its center and extends in the longitudinal direction of the cable mounting 4.

The cover 9 has three regions:
a first rectangular region 93, which when the cover 9 is closed is arranged in the identically-shaped recess 46 of the base 41 of the cable mounting 4;
a second central region 94, in which the penetration contacts 91 are arranged and on which the plug contacts 92 are arranged and on the side of which, facing the wall and facing away from the axis, a snap mounting 97 is integrally molded;
and a rectangular third region 95, which has the width of the base 41.

The cover 9 is connected to the cable mounting 4 via an axis 96 arranged on the base 41 at the end in the recess 46 and penetrating the first region 93. When the cover 9 is being closed, the first region 93 engages in the identically-shaped recess 46 of the base 41, and the penetration contacts 91 cut into the cable 5. The snap mounting 97 locks on a shoulder 47 which is arranged on that side of the cable mounting 4 facing away from the axis.

Arranged on the recess 14 of the instruments, at the ends, for their fastening to the top-hat rail 2, there are, for example, two sliding bolts which, following the plugging on of the respective instrument, are closed on that side facing the wall behind the outer edges of the top-hat rail 2 at the sides of the snap mounting 42 of the cable mounting. Furthermore, plug connectors, which produce an electrical connection to the plug contacts 92 while the instrument is being locked on, are arranged in the recess 14.

In order to guide the instrument during mounting, the base 41 and the third region of the cover 9 engage into the identically-shaped recesses 13, 14 of the instrument. For the purpose of the additional stabilization of the instrument, two fixing elements 98 are integrally molded on that side of the cover 9 facing away from the wall, said fixing elements likewise engaging in identically-shaped, not shown, recesses in the instrument.

One advantage of such a device is that the instruments can be placed onto the top-hat rail 2 straight, that is to say without rotation or tilting of the same. The penetration of the insulation of the cable 5, which requires a certain force to be exerted, for example in the case of using solid materials as insulation material, is carried out by closing the cover 9. In comparison with the instrument, the latter is small, and the required force can be easily exerted by means of the lever arm present. In the case of large and/or heavy instruments, this considerably facilitates the handling.

Figure 5A:
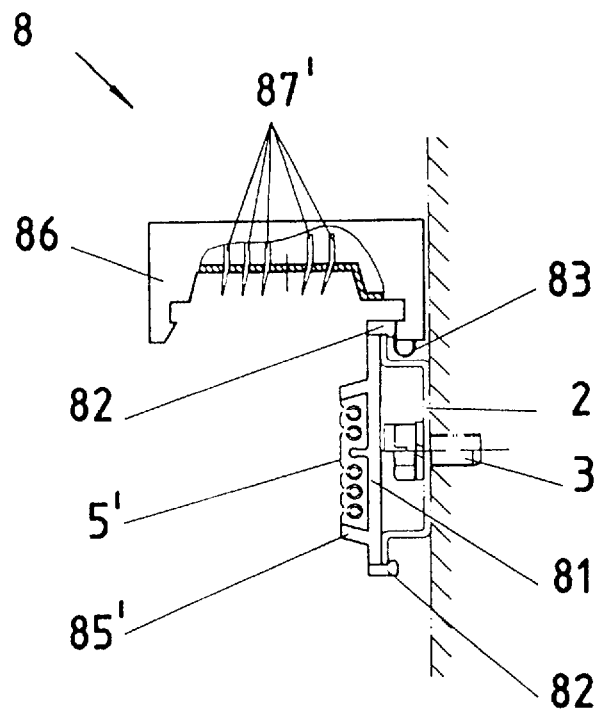
FIG. 5a shows a partially sectioned side view of a coupling module.
Figure 5B:
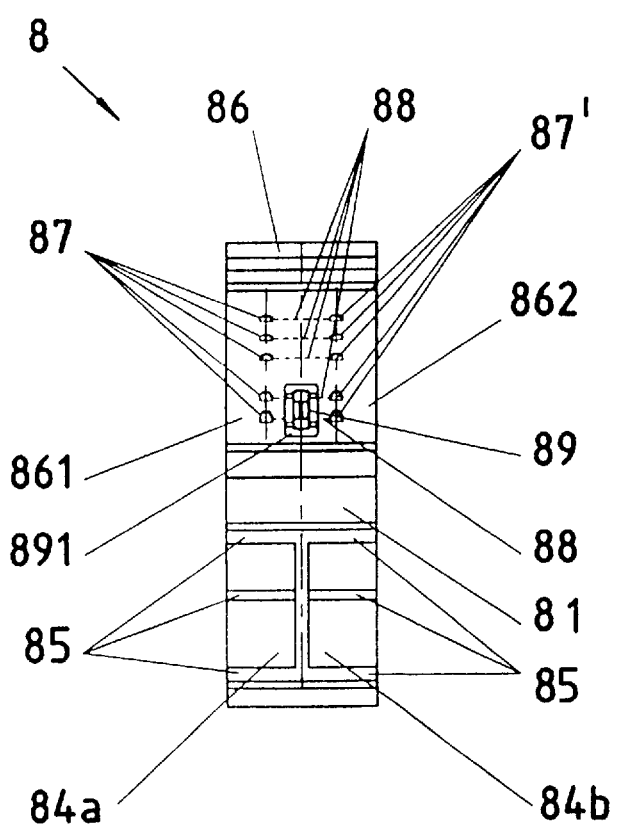
FIG. 5b shows a top view of the coupling module of FIG. 5a with the cover opened.

In a multiplicity of applications it is necessary to fit individual instruments or group of instruments at locations remote from one another and to connect them to a common line. To this end, a coupling module 8, represented in FIGS. 5a and 5b, is provided.

The coupling module 8 can be used both as an end piece—in this case it is to be arranged alongside an individual instrument or a group of instruments—and as a connecting element for lengthening the cable 5 between two groups of instruments which are arranged remotely from each other, two individual instruments which are arranged remotely from each other or between one group of instruments at an individual instrument arranged remotely from the group.

The coupling module 8 has a rectangular basic element 81, on one basic area of which there is integrally molded a snap mounting 82, by means of which said element can be locked on a top-hat rail 2. Such a basic element 8 can equally well be locked onto another type of rail. It is then necessary only to construct the snap mounting 81 in an appropriate other manner.

Instead of the snap mounting 81, it is possible to provide on the basic element 8, at the side, a connecting device which can be connected to the connecting device of the baseplate 7 of the wall fastening. Such a basic element 8 is preferably constructed just like the baseplate 7 of the fastening element and has holes for the accommodation of screws, by means of which it can be screwed on a wall.

The following description of the coupling module 8 applies to the same extent for the embodiments explained. The basic element 81 has a first and a second section 84*a*, 84*b*. Integrally molded in both sections 84*a*, 84*b* is a profile 85, 85' in each case reproducing the shape of the line 5. Depending on the application, a cable 5, 5' can consequently be inserted into both sections 84*a*, 84*b*.

A cover 86 is provided which, in the closed state, covers the two sections 84*a*, 84*b*. Said cover is connected to the basic element 8 via a hinge 83.

FIG. 5*b* shows a top view of the coupling module 8 with the cover 86 opened. The cover 86 has two regions 861, 862. These are arranged such that, when the cover 86 is closed, the region 861 is located opposite the first section 84*a*, and the region 862 is located opposite the second section 84*b*. Arranged in both regions 861, 862 are penetration contacts 87, 87' which, if a cable 5 is inserted into the corresponding section, pierce the insulation of this cable 5 and produce an electrical connection to its wires.

Between each respective penetration contact 87 in the first region 861 and the penetration contact 87' arranged at the same level in the second region 862 there is an electrical connection. To this end, connecting cables 88, represented by dashed lines in FIG. 5*b*, are arranged within the cover 86.

The two separately arranged wires of the cable 5 can be connected to each other by means of a resistor 89, which can be plugged in, for the case in which these are signal lines. An opening 891 is arranged in the cover 86 to accommodate the resistor 89. In said opening there are two spring terminals, not shown in FIG. 5*b*, into which the resistor 89 may be plugged, forming an electrical connection, and which terminals are electrically conductively connected to the two penetration contacts 87, which make contact with the separately arranged two wires of the cable 5 inserted into the first section 84*a* or of the cable 5 inserted into the second section 84*b*.

If the purpose of use so requires, a coupling module can also have three regions, into which a cable may be inserted in each case. The three regions are, for example, arranged in a T-shape. Given corresponding wiring in the cover of the coupling module, the formation of a branch is thus possible.

We claim:

1. A device for the detachable fastening of one or more instruments (1) at one or more locations and for their electrical connection to a cable (5) having one or more wires, using at least one fastening element which is mounted at one of the locations, in which device each instrument (1) has a snap mounting (12) by means of which it can be locked onto the respective fastening element and the electrical connection of the respective instrument (1) is carried out while it is being locked on, wherein a cable mounting (4) is arranged on the fastening element, which cable mounting has a profile (45) reproducing the cable shape, into which the cable (5) is inserted, and which has a guide element which, while the instrument (1) is being locked on, engages into an identically-shaped recess (13) in the instrument (1) and wherein the connection of the respective instrument (1) to the wires of the cable (5) while the respective snap mounting (12) is being locked onto the respective fastening element is carried out by penetration contacts (6) arranged on the respective instrument (1).

2. A device for the detachable fastening of one or more instruments (1) at one or more locations and for their electrical connection to a cable (5) having one or more wires, using at least one fastening element which is mounted at one of the locations, in which device each instrument (1) has a snap mounting (12) by means of which it can be locked onto the respective fastening element and the electrical connection of the respective instrument (1) is carried out while it is being locked on, wherein a cable mounting (4) is arranged on the fastening element, which cable mounting has a profile (45) reproducing the cable shape, into which the cable (5) is inserted, and which has a guide element which, while the instrument (1) is being locked on, engages into an identically-shaped recess (13) on the instrument (1), wherein a cover (9) is provided for the cable mounting (4), on the inside of which penetration contacts (91) are arranged, which, when the cover (9) is being closed, produce an electrical connection to the wires of the cable (5), and on the outside of which plug contacts (92) are arranged, which are electrically conductively connected to the penetration contacts (91), and wherein the connection of the respective instrument (1) to the plug contacts (92) while the respective snap mounting (12) is being locked onto the respective fastening element is carried out by plug connectors arranged on the respective instrument (1).

3. The device as claimed in claim 1, wherein the fastening element is a commercially available rail, especially a top-hat rail (2), on which instruments (1) can be locked by means of the snap mountings (12), and wherein the cable mountings (4) likewise have snap mountings (42) and can be locked on at any arbitrary location along the rail.

4. The device as claimed in claim 1, wherein the fastening element is a wall fastening, which has a baseplate (7) which is fixed on, especially screwed onto, a wall, wherein a rail element (44), especially a top-hat rail section, is integrally molded onto the front area, facing away from the wall, of the baseplate (7), and wherein the cable mounting (4) is integrally molded onto the rail element (44).

5. The device as claimed in claim 4, wherein the fastening element has a snap mounting on its side facing the wall and wherein it may be optionally fastened on a wall or locked onto a rail using the snap mounting.

6. The device as claimed in claim 4, wherein the baseplate (7) has at the side at least one connection device by means of which it can be connected to at least one further baseplate (7).

7. The device as claimed in claim 3, wherein a coupling module (8) is provided which has a basic element (81) which can be snapped onto the rail (2).

8. The device as claimed in claim 4, wherein a coupling module (8) is provided which has a basic element (81) which can be connected to the connection device of the baseplate (7).

9. A coupling module (8) as claimed in claim 7, wherein the basic element (81) has a first and a second section (84a, 84b), each of which has a profile (85, 85') that reproduces the cable shape, wherein a cover (86) is provided which covers the two sections (84a, 84b), wherein one end of the cable (5) can be inserted into the profile (85) of the first section (84a), wherein one end of a further cable (5') can be inserted into the profile (85') of the second section (84b), wherein penetration contacts (87, 87') are arranged in the cover (86), in a first region (861) which is opposite the first section (84a) when the cover (86) is closed, and in a second region (862) which is opposite the second section (84b) when the cover (86) is closed, and wherein there is an electrical connection between the penetration contacts (87) in the first region (861) and the corresponding penetration contacts (87') in the second region (862).

10. The device as claimed in claim 9, wherein at least two wires of the cable (5) are data lines and wherein there is arranged in the coupling module (8) a resistor (88) via which two of the data lines are interconnected.

11. The device as claimed in claim 2, wherein the fastening element is a commercially available rail, especially a top-hat rail (2), on which instruments (1) can be locked by means of the snap mountings (12), and wherein the cable mountings (4) likewise have snap mountings (42) and can be locked on at any arbitrary location along the rail.

12. A coupling module (8) as claimed in claim 8, wherein the basic element (81) has a first and a second section (84a, 84b), each of which has a profile (85, 85') that reproduces the cable shape, wherein a cover (86) is provided which covers the two sections (84a, 84b), wherein one end of the cable (5) can be inserted into the profile (85) of the first section (84a), wherein one end of a further cable (5') can be inserted into the profile (85') of the second section (84b), wherein penetration contacts (87, 87') are arranged in the cover (86), in a first region (861) which is opposite the first section (84a) when the cover (86) is closed, and in a second region (862) which is opposite the second section (84b) when the cover (86) is closed, and wherein there is an electrical connection between the penetration contacts (87) in the first region (861) and the corresponding penetration contacts (87') in the second region (862).

* * * * *